(12) United States Patent
Ouhadi

(10) Patent No.: US 7,413,784 B2
(45) Date of Patent: Aug. 19, 2008

(54) THERMOPLASTIC VULCANIZATES FOR POTABLE WATER APPLICATIONS

(75) Inventor: Trazollah Ouhadi, Liege (BE)

(73) Assignee: Advanced Elastomer Systems, L.P., Akron, OH (US)

( * ) Notice: Subject to any disclaimer, the term of this patent is extended or adjusted under 35 U.S.C. 154(b) by 56 days.

(21) Appl. No.: 11/455,462

(22) Filed: Jun. 19, 2006

(65) Prior Publication Data

US 2007/0292648 A1    Dec. 20, 2007

(51) Int. Cl.
*B32B 1/08* (2006.01)
*C08K 5/01* (2006.01)
*C08L 9/00* (2006.01)

(52) U.S. Cl. ............... 428/36.9; 428/36.91; 428/36.92; 523/122; 524/491; 524/507; 524/516; 524/525

(58) Field of Classification Search ................. 523/122; 524/475, 491, 507, 516, 525; 428/36.9, 36.91, 428/36.92
See application file for complete search history.

(56) References Cited

U.S. PATENT DOCUMENTS

| | | | |
|---|---|---|---|
| 4,132,698 | A | 1/1979 | Gessler et al. |
| 4,311,628 | A | 1/1982 | Abdou-Sabet et al. |
| 4,645,791 | A | 2/1987 | Theodore et al. |
| 4,749,502 | A | 6/1988 | Alexander et al. |
| 4,774,277 | A | 9/1988 | Janac et al. |
| 4,833,195 | A | 5/1989 | Adur et al. |
| 5,171,908 | A * | 12/1992 | Rudnick ..................... 585/255 |
| 5,552,482 | A * | 9/1996 | Berta ........................... 525/88 |
| 6,001,455 | A | 12/1999 | Nishio et al. |
| 6,084,031 | A | 7/2000 | Medsker et al. |
| 6,337,364 | B1 | 1/2002 | Sakaki et al. |
| 6,451,915 | B1 | 9/2002 | Ellul et al. |
| 6,750,292 | B2 | 6/2004 | Dozeman et al. |
| 7,060,753 | B2 | 6/2006 | Jacob et al. |
| 2003/0181575 | A1 | 9/2003 | Schmidt et al. |
| 2004/0106723 | A1 | 6/2004 | Yang et al. |
| 2004/0186214 | A1 | 9/2004 | Li et al. |
| 2004/0266948 | A1 | 12/2004 | Jacob et al. |
| 2005/0170117 | A1 * | 8/2005 | Cleveland et al. ........ 428/36.91 |
| 2005/0281973 | A1 | 12/2005 | Park |
| 2006/0008643 | A1 | 1/2006 | Lin et al. |
| 2006/0100347 | A1 * | 5/2006 | Ouhadi et al. ............... 524/502 |
| 2006/0128875 | A1 | 6/2006 | Bradley et al. |
| 2006/0167184 | A1 * | 7/2006 | Waddell et al. ............. 525/192 |

FOREIGN PATENT DOCUMENTS

| | | |
|---|---|---|
| EP | 0300689 | 1/1989 |
| EP | 0 315 363 | 1/1994 |
| EP | 0315363 | 1/1994 |
| EP | 0428153 | 3/1995 |
| EP | 1028145 | 1/2003 |
| EP | 1211285 | 5/2006 |
| JP | 04063851 | 2/1992 |
| JP | 07292167 | 11/1995 |
| JP | 0920876 | 8/1997 |
| JP | 10036569 | 2/1998 |
| JP | 2001/049056 | 2/2001 |
| SU | 812800 | 3/1981 |
| SU | 857179 | 8/1981 |
| WO | WO98/44041 | 10/1998 |
| WO | 2002/018487 | 3/2002 |
| WO | 2002/031044 | 4/2002 |
| WO | WO02/31044 | 4/2002 |
| WO | 2003/048252 | 6/2003 |
| WO | WO03/048252 | 6/2003 |
| WO | 2004/014997 | 2/2004 |
| WO | 2006/118674 | 11/2006 |

OTHER PUBLICATIONS

Gedeon et al, "Use of "Clean" Paraffinic Processing Oils to Improve TPE Properties", Presented at TPEs 2000, Philadelphia, PA, Sep. 27-28, 1999 (nine pages).*

Abstract of "Effect of Technological Additives on Properties of Thermoplastic vulcanizates Base don Ethylene Propylene Rubber and Polyolefins" Kanauzov et al., Kauchuk i Rezina, 2000, (4), 12-15.

"The Effect of Oil Type and Content on the Rheological, Mechanical and Thermal Properties of a Polyolefinc Based Thermoplastic Elastomer", McShane, et al. SPE ANTEC 2002 (pp. 1-5).

* cited by examiner

*Primary Examiner*—Fred M Teskin
(74) *Attorney, Agent, or Firm*—Shawn H. Foster

(57) ABSTRACT

A thermoplastic vulcanizate comprising a dynamically-cured rubber, a thermoplastic polymer, and at least 2 percent by weight, based on the total weight of the thermoplastic vulcanizate, of a polyalphaolefin oligomer, where the polyalphaolefin oligomer is characterized by a kinematic viscosity per ASTM D445 at 100° C. of at least 35 cSt.

22 Claims, No Drawings

US 7,413,784 B2

THERMOPLASTIC VULCANIZATES FOR POTABLE WATER APPLICATIONS

FIELD OF THE INVENTION

One or more embodiments of the present invention are directed toward thermoplastic vulcanizates that are characterized by reduced potential for microorganism growth and the use of these thermoplastic vulcanizates in potable water applications.

BACKGROUND OF THE INVENTION

Thermoplastic elastomers are known. They have many of the properties of thermoset elastomers, yet they are processable as thermoplastics. One type of thermoplastic elastomer is a thermoplastic vulcanizate, which may be characterized by finely-divided rubber particles dispersed within a plastic matrix. These rubber particles are crosslinked to promote elasticity.

For example, U.S. Pat. No. 6,750,292 teaches thermoplastic vulcanizates that include a semi-crystalline polyolefin, a rubber that is at least partially vulcanized, and an oil. The oil is characterized by low aromatic content (less than 4 weight percent), and has a viscosity of at least 85 cSt (and preferably 90-25 cSt) as measured at 40° C. The oil to rubber (e.g., EPDM) ratio is from 0.7 to 2.0, and preferably between 1.3 and 1.6.

Because thermoplastic vulcanizates have many advantageous characteristics including processability, ease of fabrication, and useful mechanic and dynamic properties, thermoplastic vulcanizates are widely used. In particular applications, thermoplastic vulcanizates are used in applications where they are in contact with water, particularly potable water. As a result, these articles often must meet governmental standards for microorganism growth (i.e., give rise to less than threshold amounts of microorganism growth). Inasmuch as thermoplastic vulcanizates are hydrocarbon-based, the ability to meet these governmental standards is not trivial.

SUMMARY OF THE INVENTION

One or more embodiments of the present invention provides a thermoplastic vulcanizate comprising a dynamically-cured rubber, a thermoplastic polymer, and at least 2 percent by weight, based on the total weight of the thermoplastic vulcanizate, of a polyalphaolefin oligomer, where the polyalphaolefin oligomer is characterized by a kinematic viscosity per ASTM D445 at 100° C. of at least 35 cSt.

One or more embodiments of the present invention also provides, in combination, an article and water, where the article includes a thermoplastic vulcanizate including a dynamically-cured rubber, a thermoplastic polymer, and at least 2% by weight, based on the total weight of the thermoplastic vulcanizate, of a polyalphaolefin oligomer, where the polyalphaolefin oligomer is characterized by a kinematic viscosity per ASTM D445 at 100° C. of at least 35 cSt.

DETAILED DESCRIPTION OF ILLUSTRATIVE EMBODIMENTS

One or more embodiments of the present invention are directed toward thermoplastic vulcanizates that include a polyalphaolefin oligomer. The use of particular polyalphaolefins has advantageously and surprisingly provided thermoplastic vulcanizates with advantageous properties including reduced microorganism growth potential as compared to those thermoplastic vulcanizates that include other extenders. In particular embodiments, the thermoplastic vulcanizates meet United Kingdom standards (WRc-NSF-Ltd) for microorganism growth for potable water applications.

The thermoplastic vulcanizates of one or more embodiments of the present invention include a dynamically-cured rubber, a thermoplastic polymer, and a polyalphaolefin oligomer. Also, the thermoplastic vulcanizates may include other constituents that are conventionally employed in the art of thermoplastic vulcanizates.

Any rubber or mixture thereof that is capable of being dynamically cured may be used. Reference to a rubber may include mixtures of more than one rubber. Non-limiting examples of useful rubbers include olefinic elastomeric copolymers, butyl rubber, natural rubber, styrene-butadiene copolymer rubber, butadiene rubber, acrylonitrile rubber, butadiene-styrene-vinyl pyridine rubber, urethane rubber, polyisoprene rubber, epichlorohydrin terpolymer rubber, polychloroprene, and mixtures thereof. In one or more embodiments, olefinic elastomeric copolymers include ethylene-propylene rubbers, propylene-based rubbery copolymers, and ethylene-based plastomers.

The term ethylene-propylene rubber refers to rubbery copolymers polymerized from ethylene, at least one α-olefin monomer, and optionally at least one diene monomer. The α-olefins may include, but are not limited to, propylene, 1-butene, 1-hexene, 4-methyl-1-pentene, 1-octene, 1-decene, or combinations thereof. In one embodiment, the α-olefins include propylene, 1-hexene, 1-octene or combinations thereof. The diene monomers may include, but are not limited to, 5-ethylidene-2-norbornene; 5-vinyl-2-norbornene; divinyl benzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; or a combination thereof. In the event that the copolymer is prepared from ethylene, α-olefin, and diene monomers, the copolymer may be referred to as a terpolymer or even a tetrapolymer in the event that multiple α-olefins or dienes are used.

In one or more embodiments, the ethylene-propylene rubber includes from about 12 to about 85% by weight, or from about 20 to about 80% by weight, or from about 40 to about 70% by weight, or from about 60 to about 66% by weight ethylene units deriving from ethylene monomer, and from about 0.1 to about 15% by weight, or from about 0.5 to about 12% by weight, or from about 1 to about 10% by weight, or from about 2 to about 8% by weight diene units deriving from diene monomer, with the balance including α-olefin units deriving from α-olefin monomer (e.g., $C_3$-$C_{10}$ olefins such as propylene). Expressed in mole percent, the terpolymer of one embodiment includes from about 0.1 to about 5 mole percent, or from about 0.5 to about 4 mole percent, or from about 1 to about 2.5 mole percent diene units deriving from diene monomer. In one or more embodiments, where the diene includes 5-ethylidene-2-norbornene the ethylene-propylene rubber may include at least 1% by weight, in other embodiments at least 8% by weight, and in other embodiments at least 10% by weight units deriving from 5-ethylidene-2-norbornene.

In one or more embodiments, ethylene-propylene rubbers have a weight average molecular weight ($M_w$) that is greater than 50,000, in other embodiments greater than 100,000, in other embodiments greater than 200,000, and in other embodiments greater than 300,000; and the weight average molecular weight of the preferred ethylene-propylene rubbers of one embodiment is less than 1,200,000, in other embodiments less than 1,000,000, in other embodiments less than 900,000, and in other embodiments less than 800,000. In one or more embodiments, useful ethylene-propylene rubbers have a number average molecular weight ($M_n$) that is greater than 20,000, in other embodiments greater than 60,000, in other embodiments greater than 100,000, and in other embodiments greater than 150,000; and the number average molecular weight of the ethylene-propylene rubbers of one or more embodiments is less than 500,000, in other embodiments less than 400,000, in other embodiments less than 300,000, and in other embodiments less than 250,000.

In one or more embodiments, ethylene-propylene rubbers may also be characterized by having a Mooney viscosity ($ML_{(1+4)}$ at 125° C.) per ASTM D 1646, of from about 10 to about 500 or from about 50 to about 450.

In one or more embodiments, ethylene-propylene rubbers may be characterized by having an intrinsic viscosity, as measured in Decalin at 135° C., of from about 1 to about 8 dl/g, or from about 3 to about 7 dl/g, or from about 4 to about 6.5 dl/g.

In one or more embodiments, the ethylene-propylene rubbers may be characterized by a glass transition temperature (Tg), as determined by Differential Scanning Calorimetry (DSC) according to ASTM E 1356, that is less than −20° C., in other embodiments less than −30° C., in other embodiments less than −50° C., and in other embodiments from about −20 to about −60° C.

Ethylene-propylene rubbers may be manufactured or synthesized by using a variety of techniques. For example, these copolymers can be synthesized by employing solution, slurry, or gas phase polymerization techniques that employ various catalyst systems including Ziegler-Natta systems including vanadium catalysts and take place in various phases such as solution, slurry, or gas phase. Exemplary catalysts include single-site catalysts including constrained geometry catalysts and Group IV-VI metallocenes, and Brookhart catalysts. Elastomeric copolymers are commercially available under the tradenames Vistalon™ (ExxonMobil Chemical Co.; Houston, Tex.), Keltan™ (DSM Copolymers; Baton Rouge, La.), Nordel™ IP (DuPont Dow Elastomers; Wilmington, Del.), NORDEL MG™ (DuPont Dow Elastomers), Royalene™ (Chemtura) and Buna™ (Lanxess).

In one or more embodiments, the ethylene-based plastomers, which may also be referred to as ethylene-α-olefin copolymers, include copolymers of ethylene and one or more α-olefin comonomers. The α-olefin comonomers may include 1-butene, 1-hexene, 1-octene, 1-nonene, 1-decene, 4-methyl-1-pentene, and mixtures thereof.

In one or more embodiments, the ethylene-α-olefin copolymers may include at least 15 weight percent, in other embodiments at least 30 weight percent, and in other embodiments at least 50 weight percent units deriving from the α-olefin comonomer based upon the total weight of the copolymer. In these or other embodiments, the ethylene-α-olefin copolymers may include less than 55 weight percent, in other embodiments less than 45 weight percent, and in other embodiments less than 40 weight percent units deriving from the α-olefin comonomer based upon the total weight of the copolymer.

In one or more embodiments, the ethylene-α-olefin copolymer may be characterized by a density, as determined at room temperature per ASTM D-792, that is less than 0.900 g/cc, in other embodiments less than 0.870 g/cc, in other embodiments less than 0.865 g/cc, and in other embodiments less than 0.860 g/cc; in these or other embodiments, the ethylene-α-olefin copolymers may be characterized by a density of at least 0.850 g/cc, and in other embodiments at least 0.860 g/cc.

In one or more embodiments, the ethylene-α-olefin copolymers may be characterized by a glass transition temperature (Tg) Tg, as determined by DSC, that is less than −20° C., in other embodiments less than 30° C., in other embodiments less than 50° C., and in other embodiments from about −20° C. to about −60° C.

In one or more embodiments, the ethylene-α-olefin copolymer can have a Melt Index in g/10 min (2.16 kg @190° C.), according to ASTM 1238 (B), of less than 100, in other embodiments 50, in other embodiments 35, in other embodiments 15, and in other embodiments from about 0.1 to about 100.

In one or more embodiments, the ethylene-α-olefin copolymers may be characterized by a narrow Compositional Distribution Breadth index, as determined by using the procedure set forth in WO 93/03093, above 60%, in other embodiments above 75%, and in other embodiments above 90%.

In one or more embodiments, the propylene-based rubbery copolymer, which may also be referred to as propylene-α-olefin copolymers, include a copolymer including propylene-derived units (i.e., mer units), one or more comonomer units derived from ethylene or α-olefins including from 4 to about 20 carbon atoms, and optionally one or more comonomer units derived from dienes. In one or more embodiments, the α-olefin comonomer units may derive from ethylene, 1-butene, 1-hexene, 4-methyl-1-pentene and/or 1-octene. In one or more embodiments, the diene comonomer units may derive from 5-ethylidene-2-norbornene; 5vinyl-2-norbornene; divinyl benzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; or a combination thereof. The embodiments described below are discussed with reference to ethylene as the α-olefin comonomer, but the embodiments are equally applicable to other copolymers with other α-olefin comonomers. In this regard, the copolymer may simply be referred to as propylene-based rubbery copolymers with reference to ethylene as the α-olefin.

In one or more embodiments, the propylene-based rubbery copolymers may include at least 5% by weight, in other embodiments at least 6% by weight, in other embodiments at least 8% by weight, and in other embodiments at least 10% by weight ethylene-derived units (i.e., ethylene mer units deriving from the polymerization of ethylene); in these or other embodiments, the copolymers may include up to 35% by weight, in other embodiments up to 32% by weight, in other embodiments up to 25% by weight, and in other embodiments up to 20% by weight ethylene-derived units, where the percentage by weight is based upon the total weight of the propylene-derived, α-olefin derived units, and diene-derived units. Stated another way, the propylene-based rubbery copolymers may include at least 75% by weight, or in other embodiments at least 80% by weight, propylene-derived units; and in these or other embodiments, the copolymers may include up to 95% by weight, in other embodiments up to 94% by weight, in other embodiments up to 92% by weight, and in other embodiments up to 90% by weight propylene-derived units, where the percentage by weight is based upon the total weight of the propylene-derived, and diene derived mer units.

In one or more embodiments, the propylene-based rubbery copolymers may include at least 0.5% by weight, in other embodiments at least 1.5% by weight, and in other embodiments at least 3% by weight diene-derived units; in these or other embodiments, the propylene-based rubbery copolymers may include up to 11% by weight, in other embodiments up to 6% by weight, and in other embodiments up to 4% by weight diene-derived units, where the percentage by weight is based upon the total weight of the propylene-derived, ethylene-derived, and diene-derived units.

The propylene-based rubbery copolymers in one or more embodiments of this invention are characterized by having a single melting temperature as determined by differential scanning calorimetry (DSC). The melting point is defined as the temperature of the greatest heat absorption within the range of melting of the sample. The propylene-based rubbery copolymer may show secondary melting peaks adjacent to the principal peak, but for purposes herein, these secondary melting peaks are considered together as a single melting point, with the highest of these peaks being considered the melting point ($T_m$) of the propylene-based rubbery copolymer. In one or more embodiments, the melt temperature of the propylene-based rubbery copolymer is less than 110° C., in other embodiments less than 90° C., in other embodiments less than 80° C., and in other embodiments less than 70° C.; in these or other embodiments, the propylene-based rubbery copolymer has a melt temperature of at least 25° C., in other embodiments at least of 35° C., in other embodiments at least of 40° C., and in other embodiments at least of 45° C.

In one or more embodiments, the propylene-based rubbery copolymer may be characterized by a heat of fusion (Hf), as determined according to DSC procedures according to ASTM E 793. This may be determined by placing 6 to 10 mg of sample into DSC equipment and heating the sample at about 10° C./min. In one or more embodiments, the propylene-based rubbery copolymer may be characterized by a heat of fusion that is at least 0.5 J/g, in other embodiments at least 1.0 J/g, in other embodiments at least 1.5 J/g, in other embodiments at least 3.0, in other embodiments at least 4.0, in other embodiments at least 6.0, and in other embodiments at least 7.0. In these or other embodiments, the propylene-based rubbery copolymer may be characterized by a heat of fusion that of less than 80 J/g, in other embodiments less than 70 J/g, in other embodiments less than 60 J/g, in other embodiments less than 50 J/g, in other embodiments less than 40 J/g, in other embodiments up to 40 J/g, and in other embodiments less than 30 J/g.

The propylene-based rubbery copolymer can have a triad tacticity of three propylene units, as measured by 13C NMR, of 75%, or greater, 80% or greater, 82% or greater, 85% or greater, or 90% or greater. In one or more embodiments, ranges include from about 50 to about 99%, in other embodiments from about 60 to about 99%, in other embodiments from about 75 to about 99%, in other embodiments from about 80 to about 99%, and in other embodiments from about 60 to about 97%. Triad tacticity is determined by the methods described in U.S. Patent Application Publication 2004/0236042.

In one or more embodiments, the propylene-based rubbery copolymer may have a % crystallinity of from 0.5 to 40, in other embodiments 1 to 30, and in other embodiments 5 to 25. Crystallinity may be determined according to DSC procedures in accordance with ASTM E-794-95. This may be determined by placing 6 to 10 mg of sample is placed into DSC equipment and heating the sample at about 10° C./min. For use herein, the crystallinity of the propylene-ethylene polymer can also be expressed in terms of percentage of crystallinity. The thermal energy for the highest order of polypropylene is estimated at 189 J/g (i.e., 100% crystallinity is equal to 189 J/g). In other embodiments, the propylene-ethylene polymer may have a crystallinity of less than 40%, in other embodiments about 0.25% to about 25%, in other embodiments from about 0.5% to about 22%, and in other embodiments from about 0.5% to about 20%.

In one or more embodiments, the propylene-based rubbery copolymer can have a density of about 0.85 g/cm³ to about 0.92 g/cm³, in other embodiments about 0.87 g/cm³ to 0.90 g/cm³, and in other embodiments from about 0.88 g/cm³ to about 0.89 g/cm³ at room temperature as measured per the ASTM D-792 test method.

In one or more embodiments, the propylene-based rubbery copolymer can have a Melt Index in g/10 min (2.16 kg@190° C.), according to ASTM 1238 (B), of less than 10, in other embodiments $\leq 6.5$, in other embodiments $\leq 6$, in other embodiments $\leq 5.5$, and in other embodiments $\leq 5$.

In one or more embodiments, the propylene-based rubbery copolymer can have a melt flow rate (MFR, 2.16 kg weight @ 230° C.), as measured according to the ASTM D-1238, equal to or greater than 0.2 g/10 min, in other embodiments of at least 0.2 g/10 min, in other embodiments at least 0.5 g/10 min, and in other embodiments at least 1.0 g/10 min. In these or other embodiments, the melt flow rate may be equal to or less than 350 g/10 min, and in other embodiments less than 100 g/10 min. In an embodiment, the propylene-based polymer has an MFR of 0.5 g/10 min to 350 g/10 min, in other embodiments from 2 g/10 min to 30 g/10 min, in other embodiments from 5 g/10 min to 30 g/10 min, in other embodiments 10 g/10 min to 30 g/10 min, and in other embodiments 10 g/10 min to about 25 g/10 min.

In one or more embodiments, the propylene-based rubbery copolymers may have a Mooney viscosity [$ML_{(1+4)}@125°$ C.], as determined according to ASTM D1646, of less than 100, in other embodiments less than 75, in other embodiments less than 60, and in other embodiments less than 30.

In one or more embodiments, the propylene-based rubbery copolymer can have a weight average molecular weight ($M_w$) of about 5,000 to about 5,000,000 g/mole, in other embodiments a $M_w$ of about 10,000 to about 1,000,000, in other embodiments a $M_w$ of about 20,000 to about 500,000, and in other embodiments a $M_w$ of about 50,000 to about 400,000.

In one or more embodiments, the propylene-based rubbery copolymer can have a number average molecular weight ($M_n$) of about 2,500 to about 2,500,000 g/mole, in other embodiments a $M_n$ of about 5,000 to about 500,000, in other embodiments a $M_n$ of about 10,000 to about 250,000, and in other embodiments a $M_n$ of about 25,000 to about 200,000.

In one or more embodiments, the propylene-based rubbery copolymer can have a Z-average molecular weight ($M_z$) of about 10,000 to about 7,000,000 g/mole, in other embodiments a $M_z$ of about 50,000 to about 1,000,000, in other embodiments a $M_z$ of about 80,000 to about 700,000, and in other embodiments a $M_z$ of about 100,000 to about 500,000.

In one or more embodiments, the molecular weight distribution index (MWD=(Mw/Mn)) of the propylene-based rubbery copolymer may be about 1 to about 40, in other embodiments about 1 to about 5, in other embodiments about 1.8 to about 5, and in other embodiments about 1.8 to about 3. Techniques for determining the molecular weight (Mn and Mw) and molecular weight distribution (MWD) may be found in U.S. Pat. No. 4,540,753 (Cozewith, Ju and Verstrate) (which is incorporated by reference herein for purposes of U.S. practices) and references cited therein and in Macromolecules, 1988, volume 21, p 3360 (Verstrate et al.), which is herein incorporated by reference for purposes of U.S. practices, and references cited therein.

Propylene-ethylene polymers are available commercially under the tradenames Vistamaxx™ (ExxonMobil Chemical Company; Houston, Tex., USA) and Versify™ (The Dow Chemical Company; Midland, Mich., USA).

In one or more embodiments, butyl rubber includes copolymers and terpolymers of isobutylene and at least one other comonomer. Useful comonomers include isoprene, divinyl aromatic monomers, alkyl substituted vinyl aromatic monomers, and mixtures thereof. Exemplary divinyl aromatic monomers include vinyl styrene. Exemplary alkyl substituted vinyl aromatic monomers include α-methyl styrene and paramethyl styrene. These copolymers and terpolymers may also be halogenated such as in the case of chlorinated and brominated butyl rubber. In one or more embodiments, these halogenated polymers may derive from monomer such as parabromomethylstyrene.

In one or more embodiments, butyl rubber includes copolymers of isobutylene and isoprene, and copolymers of isobutylene and paramethyl styrene, terpolymers of isobutylene, isoprene, and divinyl styrene, branched butyl rubber, and brominated copolymers of isobutene and paramethylstyrene (yielding copolymers with parabromomethylstyrenyl mer units). These copolymers and terpolymers may be halogenated.

In one embodiment, where butyl rubber includes the isobutylene-isoprene copolymer, the copolymer may include from about 0.5 to about 30, or from about 0.8 to about 5, percent by weight isoprene based on the entire weight of the copolymer with the remainder being isobutylene.

In another embodiment, where butyl rubber includes isobutylene-paramethyl styrene copolymer, the copolymer may include from about 0.5 to about 25, and from about 2 to about 20, percent by weight paramethyl styrene based on the entire weight of the copolymer with the remainder being isobutylene. In one embodiment, isobutylene-paramethyl styrene copolymers can be halogenated, such as with bromine, and these halogenated copolymers can contain from about 0 to about 10 percent by weight, or from about 0.3 to about 7 percent by weight halogenation.

In other embodiments, where butyl rubber includes isobutylene-isoprene-divinyl styrene, the terpolymer may include from about 95 to about 99, or from about 96 to about 98.5, percent by weight isobutylene, and from about 0.5 to about 5, or from about 0.8 to about 2.5, percent by weight isoprene based on the entire weight of the terpolymer, with the balance being divinyl styrene.

In the case of halogenated butyl rubbers, the butyl rubber may include from about 0.1 to about 10, or from about 0.3 to about 7, or from about 0.5 to about 3 percent by weight halogen based upon the entire weight of the copolymer or terpolymer.

In one or more embodiments, the glass transition temperature (Tg) of useful butyl rubber can be less than about −55° C., or less than about −58° C., or less than about −60° C., or less than about −63° C.

In one or more embodiments, the Mooney viscosity ($ML_{1+8}$@125° C.) of useful butyl rubber can be from about 25 to about 75, or from about 30 to about 60, or from about 40 to about 55.

Butyl rubber can be obtained from a number of commercial sources as disclosed in the Rubber World Blue Book. For example, both halogenated and un-halogenated copolymers of isobutylene and isoprene are available under the tradename Exxon Butyl™ (ExxonMobil Chemical Co.), halogenated and un-halogenated copolymers of isobutylene and paramethyl styrene are available under the tradename EXXPRO™ (ExxonMobil Chemical Co.), star branched butyl rubbers are available under the tradename STAR BRANCHED BUTYL™ (ExxonMobil Chemical Co.), and copolymers containing parabromomethylstyrenyl mer units are available under the tradename EXXPRO 3745 (ExxonMobil Chemical Co.). Halogenated and non-halogenated terpolymers of isobutylene, isoprene, and divinyl styrene are available under the tradename Polysar Butyl™ (Bayer; Germany).

In one or more embodiments, the rubber can be highly cured. In one embodiment, the rubber is advantageously completely or fully cured. The degree of cure can be measured by determining the amount of rubber that is extractable from the thermoplastic vulcanizate by using cyclohexane or boiling xylene as an extractant. This method is disclosed in U.S. Pat. No. 4,311,628, which is incorporated herein by reference for purpose of U.S. patent practice. In one embodiment, the rubber is partially cured and has a degree of cure not more than 90 weight percent, in other embodiments not more than 50 weight percent, in other embodiments not more than 30 weight percent, in other embodiments not more than 10 weight percent, and in other embodiments not more than 5 weight percent is extractable by cyclohexane at 23° C. as described in U.S. Pat. Nos. 5,100,947 and 5,157,081, which are incorporated herein by reference for purpose of U.S. patent practice. Alternatively, in one or more embodiments, the rubber has a degree of cure such that the crosslink density is preferably at least $4 \times 10^{-5}$, in other embodiments at least $7 \times 10^{-5}$, and in other embodiments at least $10 \times 10^{-5}$ moles per milliliter of rubber. See also "Crosslink Densities and Phase Morphologies in Dynamically Vulcanized TPEs," by Ellul et al., RUBBER CHEMISTRY AND TECHNOLOGY, Vol. 68, pp. 573-584 (1995).

Any thermoplastic resin that can be employed in the manufacture of thermoplastic vulcanizates can be used to manufacture the thermoplastic vulcanizates employed in this invention. Useful thermoplastic resins may include solid, generally high molecular weight plastic resins. In one or more embodiments, these thermoplastic resins include un-functionalized resins. In other embodiments, the thermoplastic component of the thermoplastic vulcanizate may include a functionalized thermoplastic resin either alone or in combination with an unfunctionalized resin.

These resins may include crystalline and semi-crystalline polymers. In one or more embodiments, these resins may be characterized by a crystallinity of at least 25% by weight, in other embodiments at least 30% by weight, and in other embodiments at least 35% by weight. Crystallinity may be determined by dividing the heat of fusion of a sample by the heat of fusion of a 100% crystalline polymer, which is assumed to be 209 joules/gram for polypropylene or 350 joules/gram for polyethylene. Heat of fusion can be determined by differential scanning calorimetry. Where the thermoplastic resin of one or more embodiments is propylene-based, the resins may be characterized by a heat of fusion of at least 50 J/g, in other embodiments in excess of 75 J/g, and in other embodiments in excess of 100 J/g. Where the thermoplastic resins of one or more embodiments are polyethylene-based, they may be characterized by a heat of fusion of at least 85 J/g, in other embodiments at least 100 J/g, and in other embodiments at least 130 J/g.

The thermoplastic polymers may be characterized by a high-flexural modulus. Flexural modulus may be measured according to ASTM-D790A at 23° C. In one or more embodiments, the thermoplastic polymers may have a flexural modulus that is greater than 200 MPa, in other embodiments greater than 500 MPa, and in other embodiments greater than 2,000 MPa.

In one or more embodiments, useful thermoplastic resins may be characterized by an $M_w$ of from about 50 to about 2,000 kg/mole, and in other embodiments from about 100 to about 600 kg/mole. They are also characterized by a $M_n$ of about 25 to about 1,000 kg/mole, and in other embodiments about 50 to about 300 kg/mole, as measured by GPC with polystyrene standards.

In one or more embodiments, these thermoplastic resins can have a melt flow rate of about 0.2 to 5,000 dg/min, in other embodiments from about 5 to about 500 dg/min, and in other embodiments from about 10 to about 100 dg/min, per ASTM D-1238 at 230° C. and 2.16 kg load.

In one ore more embodiments, these thermoplastic resins can have a melt temperature ($T_m$) that is from about 110° C. to about 250° C., in other embodiments from about 155 to about 170° C., and in other embodiments from about 160° C. to about 165° C. They may have a glass transition temperature ($T_g$) of from about −10 to about 10° C., in other embodiments from about −3 to about 5° C., and in other embodiments from about 0 to about 2° C. In one or more embodiments, they may have a crystallization temperature ($T_c$) of these optionally at least about 75° C., in other embodiments at least about 95° C., in other embodiments at least about 100° C., and in other embodiments at least 105° C., with one embodiment ranging from 105° to 115° C.

Exemplary thermoplastic polymers include crystalline, semi-crystalline, and crystallizable polyolefins, olefin copolymers, and non-olefin resins. The thermoplastic resins may be formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof is also contemplated. Specifically included are the reactor, impact, and random copolymers of propylene with ethylene or the higher α-olefins, described above, or with $C_{10}$-$C_{20}$ diolefins. Comonomer contents for these propylene copolymers may be from 1 to about 30% by weight of the polymer, for example, See U.S. Pat. No. 6,867,260 B2. Copolymers available under the tradename VISTAMAXX™ (ExxonMobil) are specifically included. Other polyolefin copolymers may include copolymers of olefins with styrene such as styrene-ethylene copolymer or polymers of olefins with α,β-unsaturated acids, α,β-unsaturated esters such as polyethylene-acrylate copolymers. Non-olefin thermoplastic polymers may include polymers and copolymers of styrene, α,β-unsaturated acids, α,β-unsaturated esters, and mixtures thereof. For example, polystyrene, polyacrylate, and polymethacrylate may be used. Blends or mixtures of two or more polyolefin thermoplastics such as described herein, or with other polymeric modifiers, are also suitable in accordance with this invention. Useful thermoplastic polymers may also include impact and reactor copolymers.

The thermoplastic polymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

In one embodiment, the thermoplastic resin includes a homopolymer of a high-crystallinity isotactic or syndiotactic polypropylene. This polypropylene can have a density of from about 0.85 to about 0.91 g/cc, with the largely isotactic polypropylene having a density of from about 0.90 to about 0.91 g/cc. Also, high and ultra-high molecular weight polypropylene that has a fractional melt flow rate can be employed. These polypropylene resins are characterized by a melt flow rate that is less than or equal to 10 dg/min, optionally less than or equal to 1.0 dg/min, and optionally less than or equal to 0.5 dg/min per ASTM D-1238 at 2.16 kg load.

Polyalphaolefin oligomers employed in one or more embodiments of the present invention include oligomers of $C_5$ to $C_{20}$ olefins, in other embodiments oligomers of $C_5$ to $C_{18}$ olefins, in other embodiments oligomers of $C_6$ to $C_{18}$ olefins, in other embodiments oligomers of $C_6$ to $C_{14}$ olefins, in other embodiments oligomers of $C_6$ to $C_{12}$ olefins, in other embodiments oligomers of $C_8$ to $C_{12}$ olefins, and in other embodiments oligomers of $C_{10}$ olefins. In one or more embodiments, the polyalphaolefins are oligomers of 1-olefins. In one or more embodiments, the polyalphaolefins are olefins of linear olefins. Exemplary olefins include 1-pentene, 1-hexene, 1-heptene, 1-oxtene, 1-nonene, 1-decene, 1-undecene, 1-dodecene, and blends thereof.

In one or more embodiments, the polyalphaolefin oligomers include dimers, trimers, tetramers, pentamers, or mixtures thereof of the specified olefins. In one or more embodiments, the oligomers may include from about 20 to about 1,500 carbon atoms, in other embodiments from about 35 to about 400 carbon atoms, and in other embodiments from about 40 to about 250 carbon atoms.

In one or more embodiments, the polyalphaolefin oligomers may have a number average molecular weight ($M_n$) of more than 1,000 to about 21,000 g/mole, in other embodiments from about 1,200 to about 20,000 g/mole, in other embodiments from about 1,400 to about 10,000 g/mole, in other embodiments from about 1,500 to about 5,000 g/mole, in other embodiments from about 1,600 to about 3,000 g/mole.

In one or more embodiments, the polyalphaolefin oligomers may be characterized by a kinematic viscosity, per ASTM D-445 at 100° C., of at least 25 cSt, in other embodiments at least 35 cSt, in other embodiments at least 40 cSt, in other embodiments at least 60 cSt, and in other embodiments at least 80 cSt. In these or other embodiments, the polyalphaolefin oligomers may be characterized by kinematic viscosity (ASTM D-445 @ 100° C.) of less than 800, and in other embodiments less than 1,100.

In one or more embodiments, the polyalphaolefin oligomers may be characterized by a viscosity index, per ASTM D-2270, of at least 140, in other embodiments at least 148, in other embodiments at least 170, and in other embodiments at least 240. In these or other embodiments, the polyalphaolefin oligomers may be characterized by viscosity index (ASTM D-2270) of less than 280, and in other embodiments less than 310.

In one or more embodiments, the polyalphaolefin oligomers may be characterized by a pour point, per ASTM D-97, of less than −15° C., in other embodiments less than −25° C., in other embodiments less than −35° C., and in other embodiments less than −40° C. In these or other embodiments, the polyalphaolefin oligomers may be characterized by pour point (ASTM D-97) of less than −45° C., and in other embodiments less than −50° C.

In one or more embodiments, the polyalphaolefin oligomers may be characterized by a flash point, per ASTM D-92, of at least 240° C., in other embodiments at least 260° C., in other embodiments at least 280° C., in other embodiments at least 290° C., and in other embodiments from about 240° C. to about 290° C. In these or other embodiments, the polyalphaolefin oligomers may be characterized by flash point (ASTM D-92) of less than 300° C., and in other embodiments less than 290° C.

In one or more embodiments, the polyalphaolefin oligomers may be characterized by including more than 50%, and in other embodiments more than 60%, meso dyads as measured by $^{13}$Carbon NMR. In these or other embodiments, the polyalphaolefin oligomers may be characterized by including more than 50%, and in other embodiments more than 60% racemic dyads as measured by $^{13}$Carbon NMR.

The polyalphaolefin oligomers of one or more embodiments of the present invention may be characterized by a degree of tacticity, including isotacticity or syndiotacticity. The polyalphaolefin oligomers may also be atactic.

In one or more embodiments, the polyalphaolefin oligomers include those described in U.S. Pat. Nos. 5,171,908 and 5,783,531, as well as those described in SYNTHETIC LUBRICANTS AND HIGH-PERFORMANCE FUNCTIONAL FLUIDS 1-52 (Rudnick et al., 1999).

Useful polyalphaolefin oligomers are commercially available from ExxonMobil. They may be obtained under the tradenames SpectraSyn™ 40, which is characterized by a kinematic viscosity at 100° C. of 39 cSt, a viscosity index of 147, a pour point of −36° C., a specific gravity of 0.850, and a flash point of 281; SpectraSyn™ 100, which is characterized by a kinematic viscosity at 100° C. of 100 cSt, a viscosity index of 170, a pour point of −30° C., a specific gravity of 0.853, and a flash point of 283; SpectraSyn™ Ultra 150, which is characterized by a kinematic viscosity at 100° C. of 150 cSt, a viscosity index of 218, a pour point of −33° C., a specific gravity of 0.850, and a flash point of >265; SpectraSyn™ Ultra 300, which is characterized by a kinematic viscosity at 100° C. of 300 cSt, a viscosity index of 241, a pour point of −27° C., a specific gravity of 0.852, and a flash point of >265, and SpectraSyn™ Ultra 1000, which is characterized by a kinematic viscosity at 100° C. of 1,000 cSt, a viscosity index of 307, a pour point of −18° C., a specific gravity of o.855, and a flash point of >265.

Any curative that is capable of curing or crosslinking the rubber component can be used. Illustrative curatives include, but are not limited to, peroxides, phenolic resins, maleimides, and silicon-containing curatives. Those skilled in the art will be able to readily select an appropriate curative based upon the rubber to be cured. For example, peroxides may be useful for certain saturated rubbers, but phenolic resins may be useful with unsaturated rubbers (e.g., those rubbers including a unit deriving from a diene).

In certain embodiments, the curatives include an organic peroxide. Examples of organic peroxides include, but are not limited to, di-tert-butyl peroxide, dicumyl peroxide, t-butyl-cumyl peroxide, alpha,alpha-bis(tert-butylperoxy)diisopropyl benzene, 2,5 dimethyl 2,5-di(t-butylperoxy)hexane, 1,1-di(t-butylperoxy)-3,3,5-trimethyl cyclohexane, -butyl-4,4-bis(tert-butylperoxy)valerate, benzoyl peroxide, lauroyl peroxide, dilauroyl peroxide, 2,5-dimethyl-2,5-di(tert-butylperoxy)hexene-3, and mixtures thereof. Also, diaryl peroxides, ketone peroxides, peroxydicarbonates, peroxyesters, dialkyl peroxides, hydroperoxides, peroxyketals and mixtures thereof can be used. For a further discussion of peroxide curatives and their use for preparing thermoplastic vulcanizates, reference can be made to U.S. Pat. No. 5,656,693.

Peroxide can be used with or without a cross-linking aid such as a polyfunctional methacrylate monomer such as ethyleneglycol dimethacylate, diethyleneglycol dimethylacrylate, polyethyleneglycol dimethylacrylate, trimethylol propane trimethacrylate or ally methacyalte, triallyl cyanurate, or divinyl benzene. Other types of cross-linking aids include metal salts like zinc or calcium or magnesium or sodium or aluminum of α,β-unsaturated organic acids or α,β-unsaturated organic acids where the pending acid group has been neutralized, α,β-unsaturated organic acids may be acrylic, methacrylic, maleic, fumaric, ethacrylic, vinyl-acrylic, itaconoc, methyl itaconic. Other type of cross-linking aids are sulfur, p-quinone, dioxime, p,p'-dibenzol quinone dioxime, N-methyl-N,4-dinitrosoanlinw,nitrobenzene, diphenyl guanidine.

In certain embodiments, the curative includes one or more phenolic resins. Certain phenolic resin curatives can be referred to as resole resins and are made by condensation of alkyl substituted phenols or unsubstituted phenols with aldehydes, such as formaldehydes, in an alkaline medium or by condensation of bi-functional phenoldialcohols. The alkyl substituents of the substituted phenols typically contain 1 to about 10 carbon atoms. Dimethylol phenols or phenolic resins, substituted in para-positions with alkyl groups containing 1 to about 10 carbon atoms are preferred. These phenolic curatives may be thermosetting resins and can be referred to as phenolic resin curatives or phenolic resins. The phenolic resins may be used in conjunction with a catalyst system. For example, non-halogenated phenol curing resins can be used in conjunction with halogen donors and, optionally, a hydrogen halide scavenger. Where the phenolic curing resin is halogenated, a halogen donor may not be required but the use of a hydrogen halide scavenger, such as ZnO, can be used. For a further discussion of phenolic resin curing of thermoplastic vulcanizates, see U.S. Pat. No. 4,311,628. In certain embodiments, non-halogenated phenolic resins, such as those available under the tradenames SP 1045™ or SP 1044™ (Schenectady International; Schenectady, N.Y.), are employed. In other embodiments, halogenated phenolic resins, such as those available under the tradenames SP 1055T (Schenectady International), are employed.

Useful silicon-containing curatives generally include silicon hydride compounds having at least two SiH groups. These compounds react with carbon-carbon double bonds of unsaturated polymers in the presence of a hydrosilylation catalyst. Silicon hydride compounds that are useful in practicing the present invention include, but are not limited to, methylhydrogen polysiloxanes, methylhydrogen dimethylsiloxane copolymers, alkyl methyl polysiloxanes, bis(dimethylsilyl)alkanes, bis(dimethylsilyl)benzene, and mixtures thereof. Hydrosilylation includes the use of hydrosilylation catalysts. Such catalysts have included transition metals of group VIII such as palladium, rhodium, platin and the like including complexes of these metals. For a further discussion of silicon-containing curatives of thermoplastic vulcanizates. See e.g., U.S. Pat. No. 6,476,132.

In addition to the rubber, thermoplastic resin, and polyalphaolefin, the thermoplastic vulcanizates of the invention may optionally include reinforcing and non-reinforcing fillers, antioxidants, stabilizers, lubricants, anti-blocking agents, anti-static agents, foaming agents, pigments, flame retardants and other processing aids known in the rubber compounding art. These additives can comprise up to about 50 weight percent of the total composition. Fillers that can be utilized include conventional inorganics such as calcium carbonate, clays, silica, talc, titanium dioxide, carbon black and the like.

In one or more embodiments, the thermoplastic vulcanizates of this invention may include styrenic block copolymers. Exemplary styrenic block copolymers include styrene-olefin-styrene triblock copolymers such as styrene-butadiene-styrene (SBS), styrene-ethylene-butylene-styrene (S-EB-S), styrene-ethylene-propylene-styrene (S-EP-S), styrene-isoprene-styrene (SIS), hydrogenated polystyrene-isoprene/butadiene-styrene (SIBS), and derivatives thereof. Useful styrenic block copolymers may include from 10 to 60 weight percent units deriving from styrene based on the total weight of the block copolymer. The styrenic block copolymers may be characterized by a Brookfield viscosity, as measured in toluene at 25% polymer and 25° C., of from 200 to 100,000 cps.

In one or more embodiments, the thermoplastic vulcanizates of this invention contain a sufficient amount of the rubber to form rubbery compositions of matter. The skilled artisan will understand that rubbery compositions of matter include those that have ultimate elongations greater than 100 percent, and that quickly retract to 150 percent or less of their original length within about 10 minutes after being stretched to 200 percent of their original length and held at 200 percent of their original length for about 10 minutes.

Thus, in one or more embodiments, the thermoplastic vulcanizates can include at least about 25 percent by weight, in other embodiments at least about 45 percent by weight, in other embodiments at least about 65 percent by weight, and in other embodiments at least about 75 percent by weight rubber based upon total weight of composition as 100. In these or other embodiments, the amount of rubber within the thermoplastic vulcanizates can be from about 20 to about 75 percent by weight, in other embodiments from about 35 to about 65 percent by weight, and in other embodiments from about 45 to about 55 percent by weight, based on the entire weight final composition.

In one or more embodiments, the thermoplastic vulcanizate can include from about 8 to about 50, in other embodiments from about 15 to about 45, and in other embodiments from about 18 to about 40% by weight thermoplastic resin based on the total weight of the final composition as 100.

In one or more embodiments, the thermoplastic vulcanizates can include at least 2% by weight, in other embodiments at least 5% by weight, in other embodiments at least 10% by weight, and in other embodiments at least 15% by weight polyalphaolefin based upon total weight of composition as 100. In these or other embodiments, the thermoplastic vulcanizate can include up to 40% by weight, in other embodiments up to 30% by weight, and in other embodiments up to 20% by weight polyalphaolefin based upon total weight of composition as 100.

The amount of peroxide can range from about 0.01 to about 15 parts for 100 parts of rubber to be cross-linked. The amount of cross-linking aid can range from about 0.01 to about 20 parts for 100 part of rubber to be cross-linked.

The amount of phenolic resin is from about 1 to about 15 parts for 100 parts of rubber to be cross-linked. The amount of halogen donor (e.g., $SnCl_2$) can range from about 0.3 to about 3 parts for 100 parts of rubber to be cross-linked.

The amount of hydride silicon can range from about 0.1 to about 10.0 mole equivalent of SiH per carbon-carbon double bond in the rubber to be cross-linked. The amount of catalyst can range from about 0.01 to about 100 parts per million expressed as transition metal of catalyst by weight based on the weight of rubber to be crosslinked.

Fillers, such as carbon black, clay, talc, or calcium carbonate may be added in amount from about 1 to about 50, per 100 parts by weight of rubber. The amount of carbon black that can be used may depend, at least in part, upon the type of carbon black and the amount of extender oil that is used. In one or more embodiments, the thermoplastic vulcanizate, prior to the addition of the nanoclay, includes less than 40 parts by weight, in other embodiments less than 30 parts by weight, in other embodiments less than 20 parts by weight, and in other embodiments less than 10 parts by weight of a filler per 100 parts of total composition.

Where a styrenic block copolymer is included, the thermoplastic vulcanizates of this invention may contain up to 40% by weight of the styrenic block copolymer based on the total weight of the thermoplastic vulcanizate.

In one or more embodiments, the thermoplastic vulcanizates of this invention are substantially devoid of mineral oils. By substantially devoid, it is meant that the thermoplastic vulcanizates include less mineral oil than would otherwise have an appreciable impact on the technological features of the thermoplastic vulcanizate. In one or more embodiments, the thermoplastic vulcanizates includes less than 8% by weight, and in other embodiments less than 5% by weight, in other embodiments less than 2% by weight, and in other embodiments less than 1% by weight mineral oil, where the weight percent is based on the total weight of the thermoplastic vulcanizate. In one embodiment, the thermoplastic vulcanizates are devoid of mineral oil. In one or more embodiments, mineral oils include petroleum-derived oils such as saturated and unsaturated aliphatic oils, aromatic oils, and naphthenic oils.

Any process for making TPVs can be employed. For example, the individual materials and components, such as the one or more rubber components, polyolefinic thermoplastic resin components, including, curing agents, additives, can be mixed at a temperature above the melting temperature of the thermoplastic components to form a melt. Illustrative mixing equipment include: extruders with kneaders or mixing elements with one or more mixing tips or flights, extruders with one or more screws, and extruders of co or counter rotating type. Suitable mixing equipment also include Brabender™ mixers, Banbury™ mixers, Buss mixers and kneaders, and Farrell Continuous mixers, for example. One or more of those mixing equipment, including extruders, can be used in series.

The one or more polyolefinic thermoplastic resin components, rubber components, and curing agents can be added to a heated mixer as individual feed streams, as a tumbled blend, or as a masterbatch. The one or more polyolefinic thermoplastic resin components can be added before cure, after cure, or divided in any proportions between before cure and after cure. Polyalphaolefin can be added during mastication, before cure, after cure, or divided in any proportions between before cure and after cure.

The one or more curing agents may be incorporated into the melt within a target range of melt temperature over a specified period of time (e.g., <120 seconds). The one or more curing agents can be added using any suitable technique, such as by injection as a solution in polyalphaolefin, as a neat solid, as a neat melt, or as a masterbatch, for example. In the event a peroxide curative is used, the rubber components, peroxide curatives and enough of the one or more thermoplastic resin components to provide the plastic matrix, in which the rubber disperses, can be blended to form the melt. Once the desired cure level is achieved, the remainder of the one or more thermoplastic resin components can be added in any proportions to avoid any unintended break down or cross-linking of the one or more thermoplastic resin components. A side feeder for a single screw or twin screw extruder can be used to add the remaining portions of the thermoplastic resin components. In which case, the side feeder may be positioned after (downstream) the desired level of cure is obtained within the extruder.

The one or more mineral fillers and other additives can be introduced to the melt before, during or after cure. The additives, fillers or other compounds, which can interfere with the curing agents, may be added after curing reaches the desired level. In one or more embodiments, the one or more mineral fillers and other additives may be added to the melt as a slurry or paste in a polyalphaolefin. Powder blends or masterbatches of these components can be prepared in a polyalphaolefin or polymer carrier to facilitate metering and mixing. A side feeder can also be used to add the one or more mineral fillers and other additives.

The desired mixing for discrete rubber phase morphology and properties can be developed through choice of screw design and screw speed. It is convenient to follow the progression of vulcanization (crosslinking) by monitoring melt temperature or mixing energy or mixing torque requirements during mixing. The mixing torque or mixing energy curve generally goes through a maximum after which the mixing can be continued to achieve the desirable cure level (state) and improve the fabricability for the blend. Following the cure and sufficient mixing of the melt, the melt blend can be processed to form an elastomeric structure using any one or more of the following techniques: milling, chopping, extrusion, pelletizing, injection molding, or any other desirable technique. Additional details for making a TPV is described in U.S. Pat. No. 4,594,390.

In one or more embodiments, the thermoplastic vulcanizates of the present invention are useful for manufacturing articles that may contact or be in long-term or continuous contact with water including potable (i.e., drinking) water. In certain embodiments, particularly where the thermoplastic vulcanizates exhibit reduced potential for microorganism growth, the articles manufactured from the thermoplastic vulcanizates of this invention may advantageously be in contact with potable/drinking water. Accordingly, articles that may advantageously be fabricated from the thermoplastic vulcanizates of this invention include hoses, tubes, multi-layer hoses, multi-layer tubes, gaskets, seals, washers, container liners including water-storage containers, and connectors.

A first particular embodiment of the invention is to a thermoplastic vulcanizate comprising a thermoplastic vulcanizate comprising (i) a dynamically-cured rubber; (ii) a thermoplastic polymer; (iii) at least 2 percent by weight, based on the total weight of the thermoplastic vulcanizate, of a polyalphaolefin oligomer, where said polyalphaolefin oligomer is characterized by a kinematic viscosity per ASTM D445 at 100° C. of at least 35 cSt. A second particular embodiment is to a thermoplastic vulcanizate of the first particular embodiment wherein said polyalphaolefin oligomer is characterized by a kinematic viscosity, per ASTM D-445 at 100° C., of at least 40 cSt. A third particular embodiment is to a thermoplastic vulcanizate of either of the first two particular embodiments where said polyalphaolefin oligomer is characterized by a kinematic viscosity, per ASTM D-445 at 100° C., of at least 25 cSt. A fourth particular embodiment is to a thermoplastic vulcanizate of either of the first three particular embodiments where said oligomer is characterized by a viscosity index, per ASTM D-2270, of at least 140. A fifth particular embodiment is to a thermoplastic vulcanizate of either of the first four particular embodiments where said polyalphaolefin oligomer is characterized by a viscosity index, per ASTM D-2270, of at least 148. A sixth particular embodiment is to a thermoplastic vulcanizate of either of the first five particular embodiments where said polyalphaolefin oligomer is characterized by a pour point, per ASTM D-97, of less than −25° C. A seventh particular embodiment is to a thermoplastic vulcanizate of either of the first six particular embodiments where said polyalphaolefin oligomer is characterized by a pour point, per ASTM D-97, of less than −35° C. An eighth particular embodiment is to a thermoplastic vulcanizate of either of the first seven particular embodiments where said polyalphaolefin oligomer is characterized by a flash point, per ASTM D-92, of at least 240° C. A ninth particular embodiment is to a thermoplastic vulcanizate of either of the first eight particular embodiments where said polyalphaolefin oligomer is characterized by a flash point, per ASTM D-92, of at least 260° C. A tenth particular embodiment is to a thermoplastic vulcanizate of either of the first nine particular embodiments where the thermoplastic vulcanizate includes at least 5% by weight, based on the total weight of the thermoplastic vulcanizate, of the polyalphaolefin oligomer. An eleventh particular embodiment is to a thermoplastic vulcanizate of either of the first ten particular embodiments where the thermoplastic vulcanizate includes at least 10% by weight, and up to 40% by weight of the polyalphaolefin based on the total weight of the thermoplastic vulcanizate.

In another embodiment, the invention includes the use of a polyalphaolefin oligomer in a thermoplastic vulcanizate including a dynamically-cured rubber and a thermoplastic polymer, the polyalphaolefin oligomer being characterized by a kinematic viscosity per ASTM D-445 at 100° C. of at least 35 cSt and the polyalphaolefin oligomer being used in an amount of at least 2% by weight based on the total weight of the thermoplastic vulcanizate, for the purpose of reducing the potential for microorganism growth on articles fabricated from the thermoplastic elastomer. In particular embodiments, these articles are in contact with potable water.

In order to demonstrate the practice of the present invention, the following examples have been prepared and tested. The examples should not, however, be viewed as limiting the scope of the invention. The claims will serve to define the invention.

EXAMPLES

Samples 1-3

Three thermoplastic vulcanizates were prepared and tested for various properties including growth of microorganisms. Each of the thermoplastic vulcanizates were prepared within a 1.3 liter internal mixer (Banbury) according to the formulation of Table I. The rubber components, the thermoplastic resin component, filler, ZnO, co-agent, and antioxidant were added to the mixer and mixed at a temperature of from 200 to 240° C. for 2 minutes. The polyalphaolefin was added followed by addition of peroxide and mixing continued for about 3 minutes at the temperature indicated above before dumping the melt. A sheet was made out of the melt on a calendar followed by granulation. The granules were injection molded to produce plaques of 150 mm long, 100 mm wide and 2 mm thick. Dumbbells were prepared from the injection molded plaques and tested according to the test procedures of Table I.

The ingredients employed in each of the samples are set forth in Table I together with the results of various physical tests performed on the thermoplastic vulcanizates. The amounts provided for each of the ingredients within Table I are provided in percent by weight based on the total weight of the thermoplastic vulcanizate and product properties.

TABLE I

| | Sample | | |
|---|---|---|---|
| | 1 | 2 | 3 |
| Ingredients | | | |
| EPDM | 50.6 | 44.6 | 50.6 |
| Reactor Polypropylene I | 23 | 23 | — |
| Reactor Polypropylene II | — | — | 23 |
| Polyalphaolefin | 5 | 10 | 5 |
| Peroxide Curative | 3 | 4 | 3 |
| Coagent | 1.5 | 1.5 | 1.5 |

TABLE I-continued

|  | Sample | | |
|---|---|---|---|
|  | 1 | 2 | 3 |
| Calcium Carbonate | 15.2 | 15.2 | 15.2 |
| Zinc Oxide | 0.6 | 0.6 | 0.6 |
| Antioxidant | 1.1 | 1.1 | 1.1 |
| Physical Properties | | | |
| Hardness | 76 | 76 | 80 |
| Compression Set (%) | 29 | 27 | 30 |
| Properties @ RT | | | |
| Tensile Strength (MPa) | 6.3 | 6.7 | 6.7 |
| Elongation @ Break (%) | 353 | 316 | 331 |
| Modulus @ 100% Strain (MPa) | 3.0/4.1 | 3.2/3.8 | 3.3/4.3 |
| Tear Strength (kN/m) | 27 | 29 | 32 |
| Properties @ 90° C. | | | |
| Tensile Strength (MPa) | 2.3 | 2.6 | 3.0 |
| Elongation @ Break (%) | 242 | 226 | 224 |
| Modulus @ 100% Strain(MPa) | 1.4 | 1.6 | 1.9 |
| Properties @ RT after | | | |
| aging 1 week @ 100° C. | | | |
| Tensile Strength (retention %) | 98 | 101 | 110 |
| Elongation @ Break (retention %) | 91 | 99 | 86 |
| Modulus @ 100% Strain (retention %) | 103 | 103 | 118 |
| Tear Strength (retention %) | 89 | 86 | 88 |
| Hardness Change | +3 | 0 | +1 |

The EPDM was an ethylene-propylene-diene terpolymer with 5-ethylidene-2-norbornene as the diene; the terpolymer was characterized by an ethylene content of 55 weight percent, a diene content of 3.8 weight percent, a Mooney viscosity ($ML_{1+4}$@125° C.) of 25, and was obtained under the tradename Vistalon™ V.2504N (ExxonMobil). Reactor polypropylene I was characterized by an MFR (230° C. @ 2.16 kg/load) of 16.5 g/10 min. and was obtained under the tradename PP 7054 L1™ (ExxonMobil). Reactor polypropylene II was characterized by an MFR (230° C. @ 2.16 kg/load) of 60 g/10 min, and was obtained under the tradename BJ 360 MO PP™ (Borealis). The polyalphaolefin was characterized by a kinematic viscosity at 100° C. of 39 cSt, a viscosity index of 147, a pour point of –36° C., a specific gravity of 0.850, a flash point of 281° C., an APHA color of 10, and was obtained under the tradename SpectraSyn™ (ExxonMobil). The peroxide curative was 2,5-dimethyl-2,5-di(t-butylperoxy) hexane in a 45 weight percent active masterbatch in kaolin and was obtained under the tradename DHBP-45-IC1™ (DeGussa). The coagent was trimethylolpropane trimethacrylate obtained under the tradename Sartomer™ SR 350 (Gray Valley). The antioxidant was obtained under the tradename Irganox™ B225 (Ciba-Geigy).

Shore hardness was determined according to ISO 868 with a 15 second interval. Ultimate tensile strength, ultimate elongation, and 100% modulus were determined according to ASTM D-412 at 23EC by using an Instron testing machine. Compression set was determined according to D-412. Tear strength was determined according to ASTM D-624, Die C. Test samples for heat-aged experiments were exposed to a temperature of 100° C. for 1 week within 1 week (168 hours).

As noted above, the samples were also tested for microorganism growth according to United Kingdom governmental standards as set forth in WRc-NSF-Ltd Report No. 248J employing methodology BS 6920 section 2.4, incubation temperature of +/–1° C. The results of this testing are set forth in Table II.

TABLE II

|  | Sample | | |
|---|---|---|---|
|  | 1 | 2 | 3 |
| Growth of Microorganism Analysis | | | |
| Mean Dissolved Oxygen Difference MDOC (mg/liter oxygen) | | | |
| Test Sample | 0.60 | 1.00 | 1.30 |
| Positive Reference | 6.90 | 6.90 | 6.90 |
| Negative Reference | –0.20 | –0.20 | –0.20 |

Test water control dissolved oxygen = 8.4 (mg/liter oxygen)

At the end of the microorganism testing, the test pieces showed no change in color or appearance. On the basis of these results, the samples of these products have been found to comply with the requirements of BS 6920 Part 1, Clause 6.

Various modifications and alterations that do not depart from the scope and spirit of this invention will become apparent to those skilled in the art. This invention is not to be duly limited to the illustrative embodiments set forth herein.

What is claimed is:

1. An article in contact with potable water, where the article is fabricated from a thermoplastic vulcanizate comprising:
   (i) a dynamically-cured rubber;
   (ii) a thermoplastic polymer;
   (iii) at least 2 percent by weight, based on the total weight of the thermoplastic vulcanizate, of a polyalphaolefin oligomer, where said polyalphaolefin oligomer is characterized by a kinematic viscosity per ASTM D445 at 100° C. of at least 25 cSt, a viscosity index of 140 or more, and a pour point of –25° C. or less.

2. The article of claim 1, where said polyalphaolefin oligomer is characterized by a kinematic viscosity, per ASTM D-445 at 100° C., of at least 40 cSt.

3. The article of claim 1, where said polyalphaolefin oligomer is characterized by a viscosity index, per ASTM D-2270, of at least 170.

4. The article of claim 1, where said polyalphaolefin oligomer is characterized by a viscosity index, per ASTM D-2270, of at least 148.

5. The article of claim 1, where said polyalphaolefin oligomer is characterized by a pour point, per ASTM D-97, of less than –40° C.

6. The article of claim 1, where said polyalphaolefin oligomer is characterized by a pour point, per ASTM D-97, of less than –35° C.

7. The article of claim 1, where said polyalphaolefin oligomer is characterized by a flash point, per ASTM D-92, of at least 240° C.

8. The article of claim 1, where said polyalphaolefin oligomer is characterized by a flash point, per ASTM D-92, of at least 260° C.

9. The article of claim 1, where the thermoplastic vulcanizate includes at least 5% by weight, based on the total weight of the thermoplastic vulcanizate, of the polyalphaolefin oligomer.

10. The article of claim 9, where the thermoplastic vulcanizate includes at least 10% by weight, and up to 40% by weight of the polyalphaolefin based on the total weight of the thermoplastic vulcanizate.

11. The article of claim 1, where the article includes a hose, a tube, a multi-layer tube, a multi-layer hose, a gasket, a seal a container liner, a washer, or a connector.

12. The article of claim 1 wherein the polyalphaolefin oligomer is characterized by an Mn of from more than 1,000 to 21,000 g/mol.

13. The article of claim 1 wherein the thermoplastic polymer is a polymer of ethylene or propylene, 1-butene, 1-hexene, 1-octene, 2-methyl-1-propene, 3-methyl-1-pentene, 4-methyl-1-pentene, 5-methyl-1-hexene, and mixtures thereof.

14. The article of claim 1 wherein the thermoplastic polymer is a copolymer of ethylene and propylene or ethylene and/or propylene with 1-butene, 1-hexene, 1-octene, 2-methyl-1-propene, 3-methyl-1-pentene, 4-methyl-1-pentene, 5-methyl-1-hexene or mixtures thereof.

15. The article of claim 1 wherein the thermoplastic polymer is a reactor, impact, or random copolymer of propylene with ethylene or with $C_{10}$-$C_{20}$ diolefin.

16. The article of claim 1 wherein the rubber of the dynamically-cured rubber is selected from the group consisting of olefinic elastomeric copolymers, butyl rubber, natural rubber, styrene-butadiene copolymer rubber, butadiene rubber, acrylonitrile rubber, butadiene-styrene-vinyl pyridine rubber, urethane rubber, polyisoprene rubber, epichlorohydrin terpolymer rubber, polychloroprene, and mixtures thereof.

17. The article of claim 1 wherein the rubber of the dynamically-cured rubber is selected from the group consisting of ethylene-propylene rubbers, propylene-based rubbery copolymers, and ethylene-based plastomers.

18. The article of claim 1 wherein the rubber of the dynamically-cured rubber is an ethylene propylene rubber.

19. The article of claim 1 wherein the rubber of the dynamically-cured rubber is selected from the group consisting of rubbery copolymers polymerized from ethylene, at least one α-olefin monomer, and optionally at least one diene monomer.

20. The article of claim 19 wherein the α-olefin monomer is selected from the group consisting of propylene, 1-butene, 1-hexene, 4-methyl-1-pentene, 1-octene, 1-decene, and combinations thereof, and the diene monomer is selected from the group consisting of 5-ethylidene-2-norbornene; 5-vinyl-2-norbornene; divinyl benzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; and combinations thereof.

21. The article of claim 18 wherein the ethylene-propylene rubber has a Mooney viscosity ($ML_{(1+4)}$ at 125° C.) per ASTM D 1646, of from about 10 to about 500.

22. The article of claim 18 wherein the ethylene-propylene rubber has a Mooney viscosity ($ML_{(1+4)}$ at 125° C.) per ASTM D 1646, of from about 50 to about 450.

* * * * *